United States Patent [19]

Okui et al.

[11] Patent Number: 4,921,239
[45] Date of Patent: May 1, 1990

[54] DOCUMENT FEEDING APPARATUS

[75] Inventors: Susumu Okui; Tsugio Hirabayashi; Izumi Hamanaka, all of Hachioji, Japan

[73] Assignee: Konishiroku Photo Industry Co., Ltd., Tokyo, Japan

[21] Appl. No.: 266,342

[22] Filed: Nov. 1, 1988

Related U.S. Application Data

[63] Continuation of Ser. No. 879,913, Jun. 27, 1986, abandoned.

[30] Foreign Application Priority Data

| Jul. 2, 1985 | [JP] | Japan | 60-146188 |
| Jul. 3, 1985 | [JP] | Japan | 60-146941 |
| Sep. 25, 1985 | [JP] | Japan | 60-213901 |
| Sep. 25, 1985 | [JP] | Japan | 60-213909 |
| Feb. 3, 1986 | [JP] | Japan | 61-21854 |

[51] Int. Cl.$^5$ ............................................. B65H 29/20
[52] U.S. Cl. ................................... 271/186; 271/291; 271/902
[58] Field of Search ............... 271/186, 291, 301, 902; 355/319-321

[56] References Cited

U.S. PATENT DOCUMENTS

| 3,409,366 | 11/1968 | Hanson | 271/301 X |
| 4,411,517 | 10/1983 | Gerken | 271/902 X |
| 4,412,740 | 11/1983 | Buddendeck | 271/902 X |
| 4,419,007 | 12/1983 | Kingsley | 271/902 X |
| 4,456,236 | 6/1984 | Buddendeck | 271/291 X |
| 4,487,506 | 12/1984 | Repp | 271/3.1 |
| 4,508,447 | 4/1985 | Doery | 355/319 |
| 4,544,148 | 10/1985 | Kitajima | 271/301 |
| 4,699,365 | 10/1987 | Smith | 355/320 X |

Primary Examiner—Richard A. Schacher
Attorney, Agent, or Firm—Jordan B. Bierman

[57] ABSTRACT

A document feeding apparatus wherein a document is separated one by one and fed onto a platen glass and subjected to exposure the outside of the document to light, and thereafter the surface of the document is reversed by a reversible rotational mechanism and again moved onto the platen glass to expose the inside of the document.

9 Claims, 8 Drawing Sheets

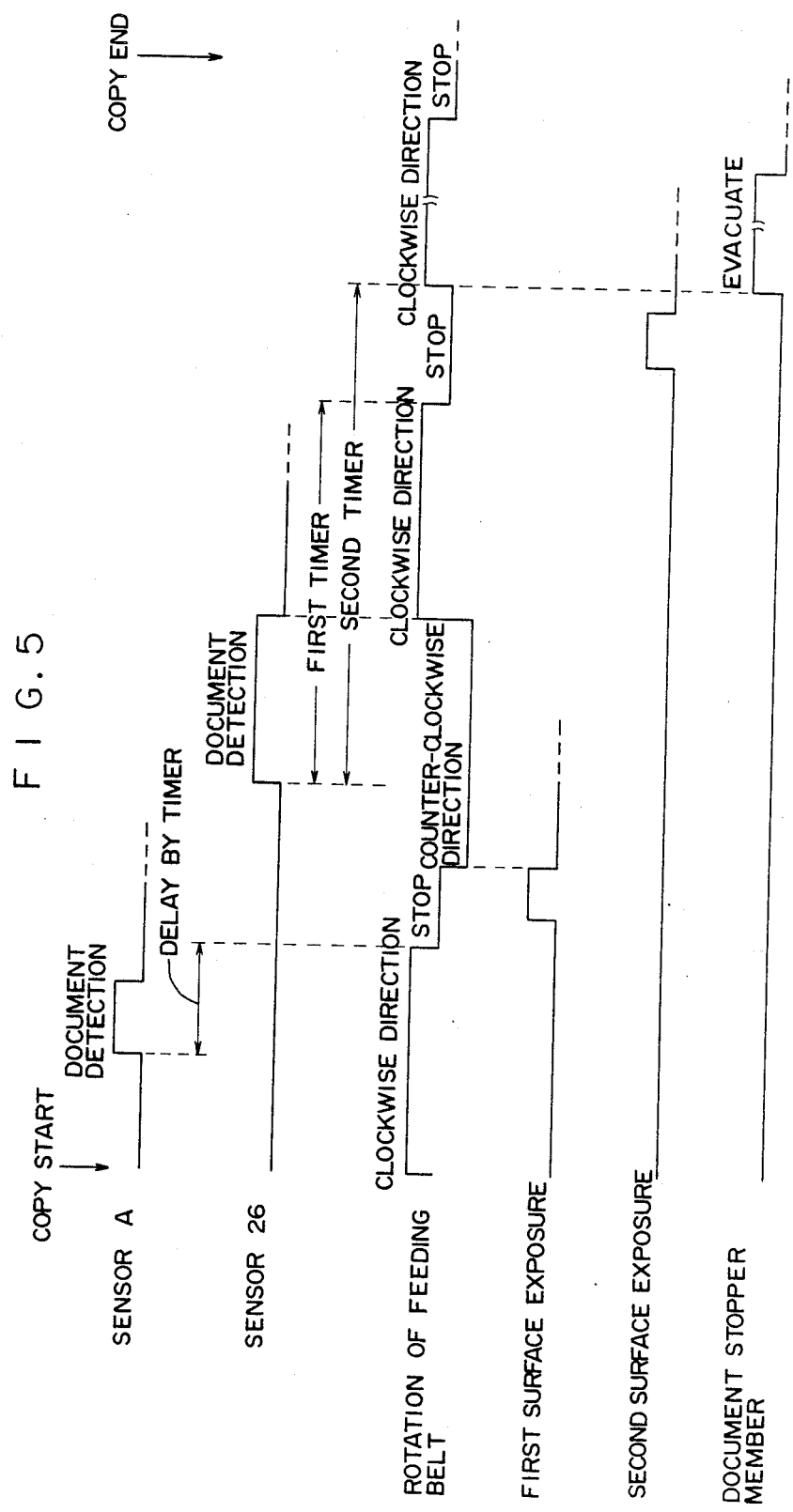

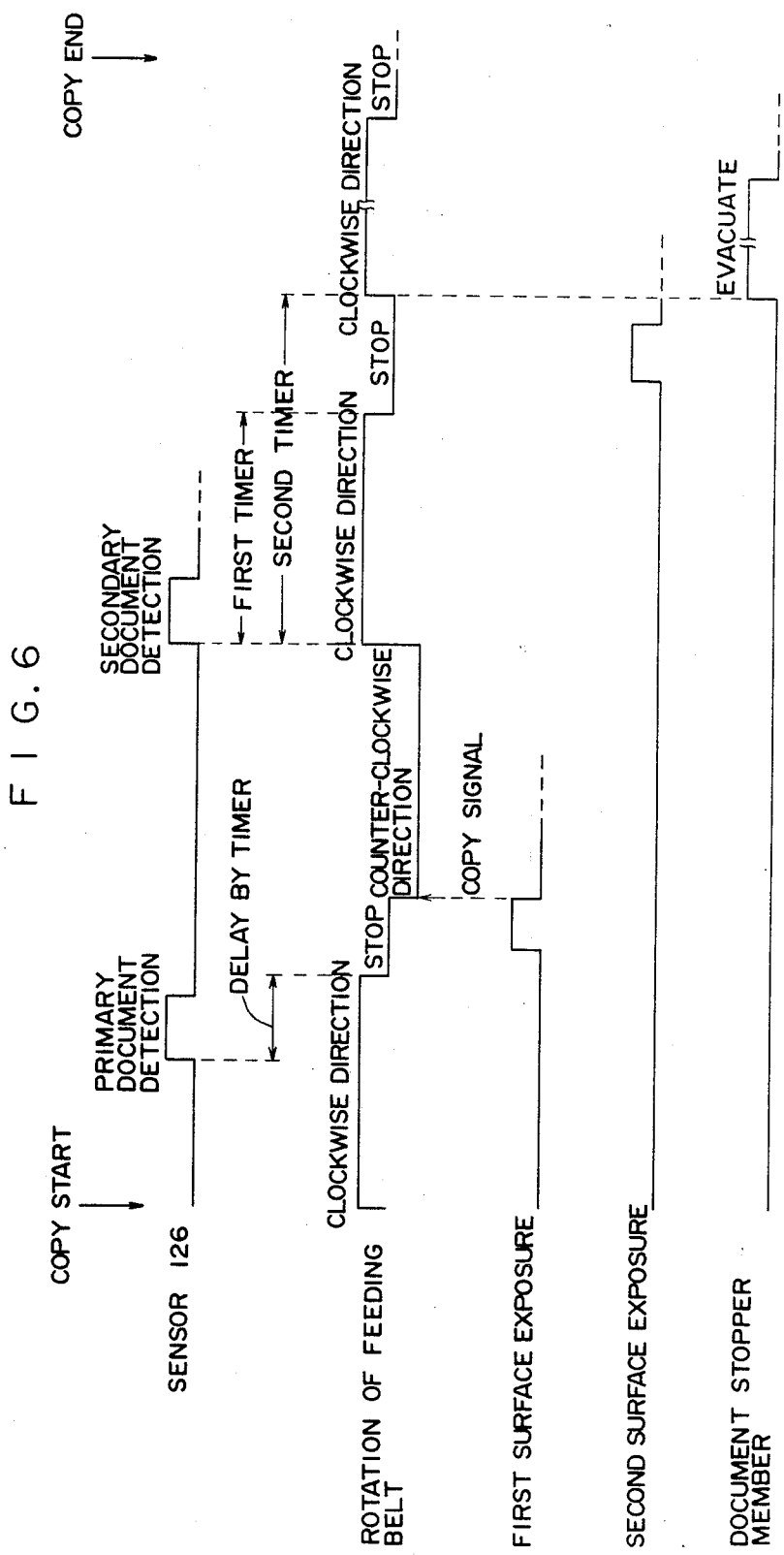

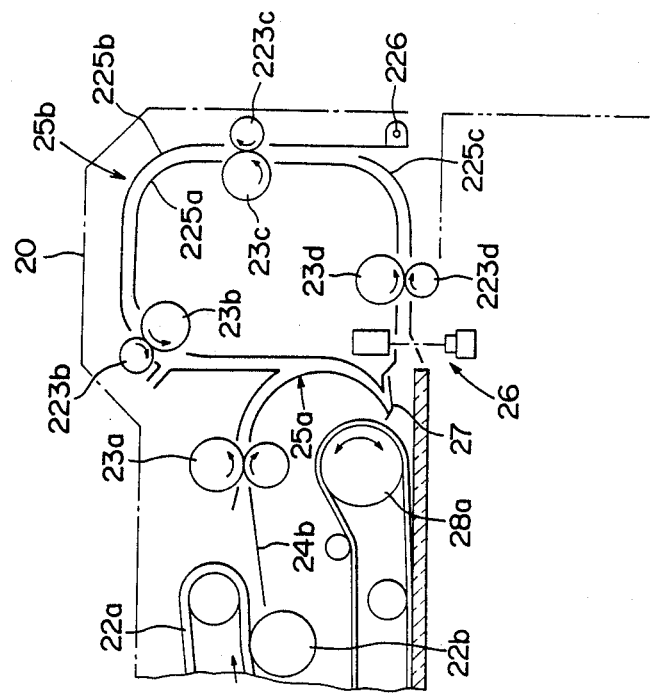
F I G. 7(a)
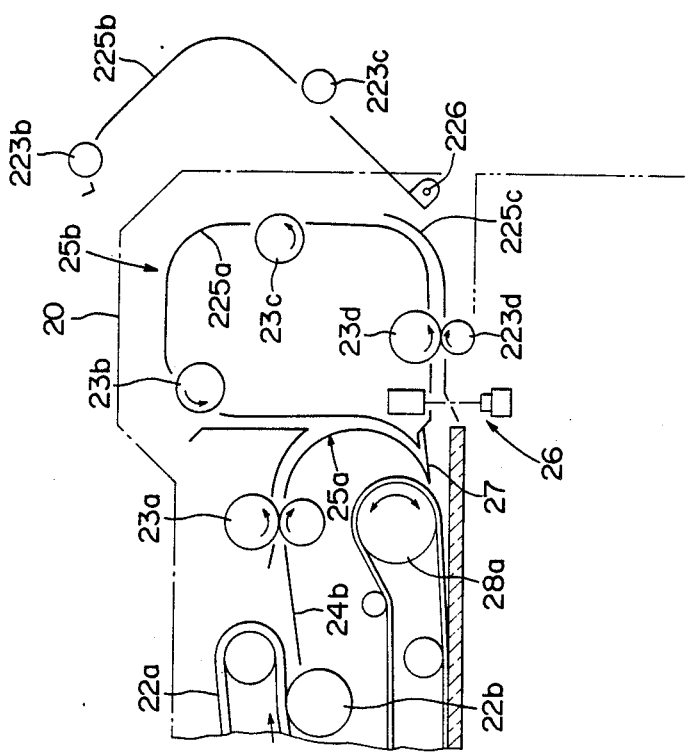
F I G. 7(b)

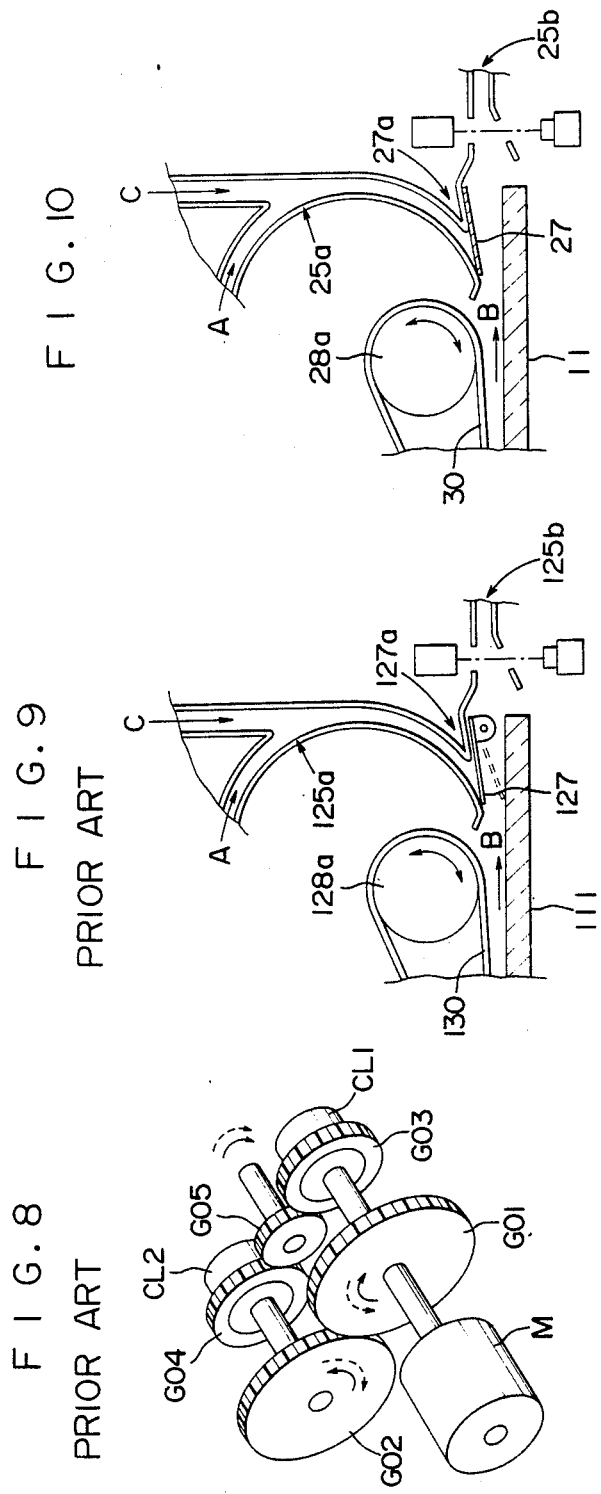

DOCUMENT FEEDING APPARATUS

This application is a continuation, of application Ser. No. 879,913, filed June 27, 1986 now abandoned.

BACKGROUND OF THE INVENTION

1. Field of the Invention:

The present invention relates to an improvement in document feeding device for use with a recording apparatus such as an electrophotographic reproducing machine and a reading machine for reading document by the exposure etc.

2. Description of the Prior Art:

As an apparatus which can supply documents to be reproduced to the recording apparatus efficiently and even in an unmanned state, automatic document feeders (ADF) have already been proposed. However, in the past, the function of the apparatus has been mainly limited to the reproduction of only one side of the document On the other hand, the necessity of ADF capable of reproducing dual-surface documents by development of the recording apparatus capable of continuously reproducing the inside and outside (two sides) of a sheet of recording paper have been recently increased, and many attempts have been proposed to provide a mechanism of reversing the inside and outside of a document within ADF. Proposals of these are disclosed in Japanese Patent Laid-Open Nos. 216159/1984 and 112738/1978, Japanese Utility Model Laid-Open No. 4548/1984, Japanese Patent Laid-Open Nos. 8834/85 and 26559/85, and the like.

These document feeding devices each comprise a document supply portion for supplying documents stacked on a document supply tray one by one to the recording apparatus, a document feeding portion adapted to stop the feed at an exposure position, a document reversing portion for reversing the inside and outside of a document one surface of which has been exposed to again feed it to the recording apparatus, and a document ejecting portion for ejecting a document the other surface of which has been exposed to a document ejecting tray. In many examples of the document feeding devices, feeding rollers disposed in these portions are driven as a whole by means of two driving motors, one for a reversible motor and the other for a uni-directional motor, in terms of a mechanism of the apparatus.

Namely, two kinds of these driving motors are necessary, one which can be switched to normal and reverse modes since the document one surface of which has been exposed in the document feeding portion has to be reversely fed to the reversing portion as is known, and the other which supplies power to the feeding rollers in the document supply portion, document reversing portion and document ejecting portion, which need be rotated only in one direction.

Furthermore, the motors are expensive, and need be synchronized. Therefore, in the case where the whole structure is driven by one kind of motor, it is necessary, for example, to obtain a driving force rotating in one direction from a reversible motor. As in a prior art example shown in FIG. 8, it becomes necessary to have the function wherein a driving device comprising at least five gears GO1, GO2, . . . GO5 and two electromagnetic clutches CL1, CL2 is provided whereby the electromagnetic clutches are actuated in response to timing of normal and reverse rotation of a driving motor M so that the rotation of a driving output may be always defined in one direction.

Alternatively, the reversible output may be obtained by means of a unidirectional driving motor in place of the aforementioned reversible driving motor but under the actual condition, the driving device having the aforementioned scale and function is necessary and in any method, a great burden is imposed on the price of the apparatus.

Moreover, since the above-described proposed ADFs employ a mechanism in which the document passes a plurality of paper passages in reversing the inside and outside of the document the surface of which has been exposed to again expose the inside, the feeding mechanism becomes complicated. In addition, the feeding rollers need be frequently switched to normal and reverse modes and driven, and besides, many paper supply/ejection switching members have to be provided on the paper passages, which lead to increasing the size of apparatus and complicating he apparatus, thus increasing the cost.

In addition, according to these proposals, documents are fed to a document reversing portion comprising a loop-like feeding passage to circulate the documents thereby reversing the inside and outside. However, since generally, the length of the feeding passage is formed to be further longer than the longest document to be used, the document reversing portion becomes relatively bulky.

However, as in the proposal in the aforementioned Japanese Utility Model Laid-Open No. 4548/1984, the feeding of documents in the document reversing portion is accomplished by sandwiching the document between a large-diameter driving roller arranged in the central portion of the aforementioned feeding passage and a plurality of pressing rollers in pressure contact with the peripheral surface of the first-mentioned roller and rotating following said driving roller, and therefore, a space portion within the document reversing portion is almost occupied by the driving roller to fail to utilize it for accommodation of other mechanism members.

Furthermore, in the ADF which can copy the inside and outside of such documents, it is necessary to drive many groups of feeding rollers in an attempt of not only delivering and feeding documents but reversing the inside and outside of documents, the ADF is controlled so as to be normally rotated, reversely rotated and stopped by signals from a control portion within the apparatus or the recording apparatus body according to the status of the document feeding by means of a large and powerful driving motor housed therein. However, in most of conventional ADFs, the driving motor cannot be accommodated within the space of the document feeding system in view of the mechanism thereof, and thus the motor had to be accommodated in a space particularly provided outside the feeding system.

This tends to increase the volume of ADF and to an unsuitable position of center of gravity, deteriorating the handling properties.

Moreover, in the document feeding device as described above, when a document surface of which has been exposed is reversed in inside and outside, the document is fed reversely to the original feeding passage, and then the document is guided to the reversing portion halfway of the feeding passage to effect the reversal of the inside and outside of the document.

FIG. 9 shows an example of such feeding passage. The document is first fed by a paper supply roller from the direction indicated by arrow A into a U-shaped guide portion 125a, the document with the surface thereof directed downwardly is then moved onto a platen glass 111 and fed to a predetermined exposure position by means of a feeding belt 130 which is rotating clockwise.

The document the surface of which has been exposed is reversely fed in the direction as indicated by arrow B by means of the feeding belt 130 which has been reversed to the counterclockwise rotation and delivered into a document reversing portion 125b. In this case, movable guide members 127 have to be provided at an outlet of the guide portion 125a and at a branched portion 127a of an inlet of the reversing portion 125b.

The movable guide member 127 used herein comprises a device in which generally, an elongated metal or resin plate is rotatably supported at both ends so that it may be switched to a position as indicated by the illustrated solid line or broken line by means of a power source such as a solenoid in response to the feeding direction of the document.

More specifically, where the document is reversely fed in the direction as indicated by arrow B as previously mentioned, the movable guide member 127 at the position as indicated at the solid line closes the outlet of the guide portion 125a to prevent the reverse movement relative to the guide portion 125a. On the other hand, where the document is moved about the reversing portion 125b and again fed from the direction indicated by arrow C onto the platen glass 111, and, where the document is fed from the direction indicated by arrow A as previously mentioned, it rotates to the position indicated by the broken line to open the outlet of the guide portion 125a.

However, such movable guide member 127 itself becomes large-sized, and the supporting construction thereof becomes somewhat complicated. In addition, it is necessary to control operating timing with respect to the power source A plurality of such members need be provided according to the feeding mechanism, which cannot be ignored in terms of space as well as cost.

SUMMARY OF THE INVENTION

It is an object of the present invention to provide a simple and inexpensive document feeding apparatus which requires no plurality of motors, requires no expensive electromagnetic clutch and thus requires no control function, while solving and improving the above-described points.

The above-described object is achieved by a document feeding apparatus comprising a reversely rotating mechanism, characterized in that a document is fed onto a platen glass for exposure, after which a surface of the document is reversed and again moved onto said platen glass.

It is a further object of the invention to provide a document feeding apparatus which bas a reversing mechanism which is simple and compact in construction.

The above-described object is achieved by a document feeding apparatus having a document supply tray on which documents are placed, said documents being separated one by one from one located on the top, reversing the document, and feeding the document on a platen glass for exposure, characterized in that an inside and outside reversing portion formed of a reversing route is separately provided, and the document is moved backward for reversal to exposure the inside thereof, after which the document is ejected to a document ejecting tray.

Another object of the present invention to provide an automatic document feeding apparatus having a document reversing portion, which is capable of accommodating a driving roller and a large mechanism member such as a driving motor within the aforementioned loop-like feeding passage.

The aforesaid object is achieved by an automatic document feeding apparatus comprising a document reversing portion composed of a loop-like feeding passage for reversing an inside and outside of a document, characterized in that the document is fed by a plurality of small-diameter feeding rollers disposed on said feeding passage of said document reversing portion.

Another object of the present invention is to provide a document feeding apparatus which is compact and excellent in operability, said apparatus capable of accommodating a driving motor internally of a document feeding route, while improving the structure of the document reversing portion.

The above-described object is achieved by a document feeding apparatus in which a document is fed onto a platen glass for exposure, after which the document is moved into a document reversing portion formed from a reversing route to reverse an inside and outside of the document, and the document is then moved onto said platen glass, characterized in that a driving motor for said document feeding apparatus is arranged internally of said reversing route.

A still another object of the present invention is to provide a document feeding apparatus in which a mere shielding member which is very simple and requires no power source or operating timing control is merely mounted on the branched portion without providing a movable guide member which is large in size and complicated in construction as has been heretofore used, to thereby feed the document into a proper feeding passage to expose the inside and outside of the document.

The aforesaid object is achieved by a document feeding apparatus in which a document is moved onto a platen glass to expose the document surface, and said document is moved back into a document reversing portion having a reversing route for reversing the inside and outside of the document and again moved onto the platen glass, characterized in that a resilient member capable of force-opening is provided at a branch portion of an outlet of said document and an inlet of said document reversing portion as a shielding member.

BRIEF DESCRIPTION OF THE DRAWINGS

FIGS. 5 and 6 are time charts showing the sequence.

FIGS(a) and 7(b) show essential parts of the automatic document feeding apparatus.

FIG. 8 is a perspective view showing a conventional driving apparatus.

FIG. 9 is an explanatory view of a conventional document feeding apparatus.

FIG. 10 is an explanatory view of a document feeding apparatus according to a further embodiment of the present invention.

DESCRIPTION OF THE PREFERRED EMBODIMENTS

Figure 1:
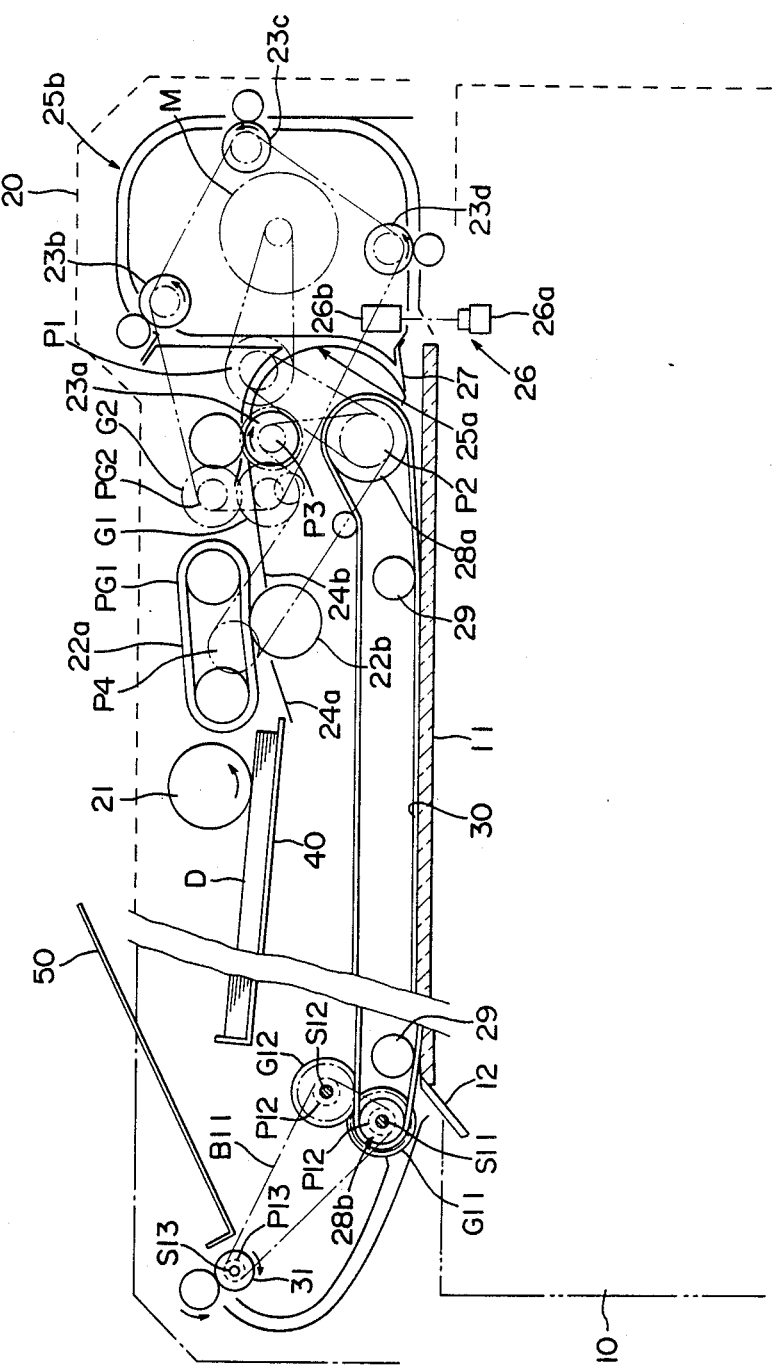
FIG. 1 is a sectional view of a document feeding apparatus according to the present invention.
Figure 2:
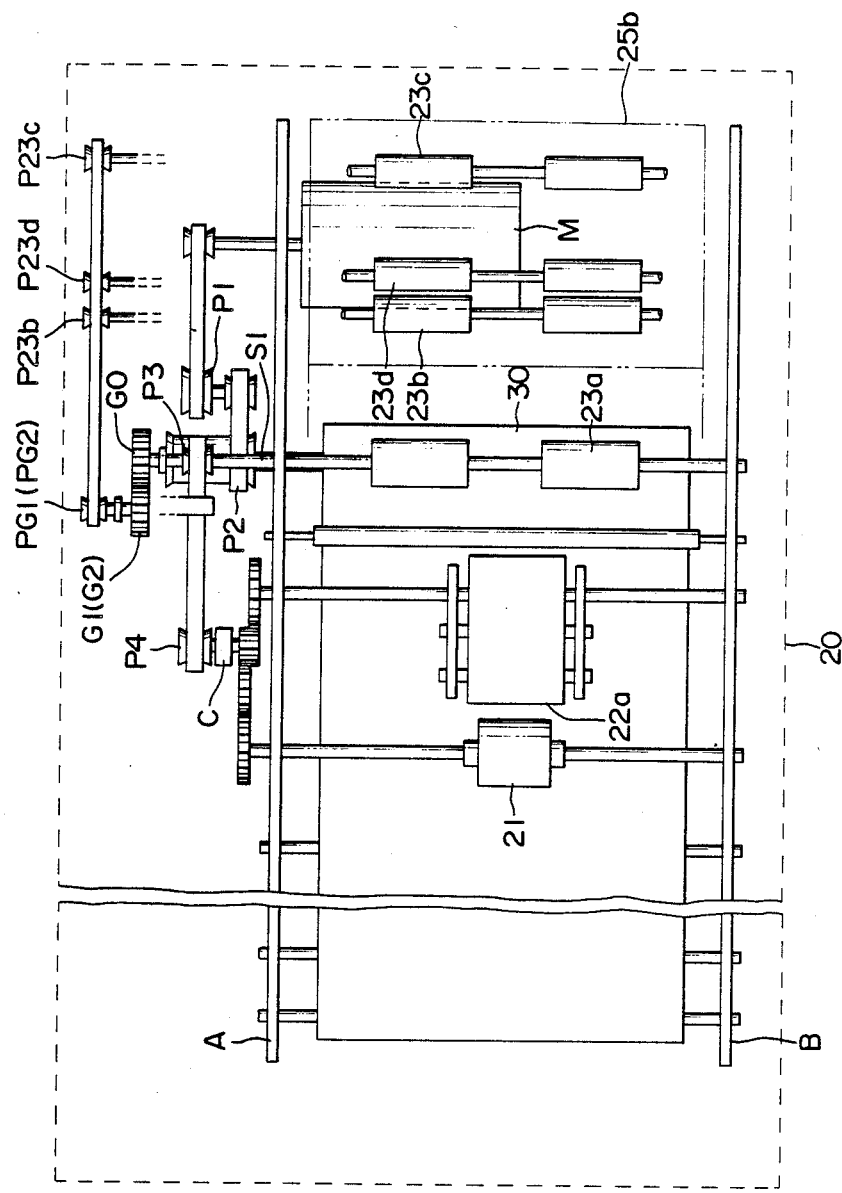
FIG. 2 is a plan view of the apparatus shown in FIG. 1.

Embodiments of the present invention are shown in FIGS. 1 to 7,

FIG. 1 shows the document feeding apparatus according to the present invention which is mounted on a recording apparatus body 10 indicated at double-dash-and-dot lines, and FIG. 2 shows a reversely rotating mechanism in said document feeding apparatus. Placed on the upper surface of the recording apparatus body 10 is a document feeding apparatus 20 (hereinafter referred to as ADF) of the present invention whose contour portion is indicated at broken lines in such a manner that the apparatus may be opened toward the inner side by the support by means of hinges or the like However, in the illustrated embodiment, the aforesaid ADF 20 is brought down this side so that a document feeding belt 30 may press against a platen glass 11 provided on the apparatus body 10.

More specifically, the ADF 20 is possible to automatically feed documents by means of a feeding mechanIsm which wIll be described hereinafter but the entire ADF 20 may be opened and closed manually to thereby possess a function as a normal platen cover.

A document supply tray 40 is located at a document supply portion arranged on the ADF 20 so as to stack documents thereon. When a copy button is depressed, each feeding mechanism is actuated by a motor M which is a driving source within the ADF 20, and first a delivery roller 21 presses against the uppermost surface of the end of a document D by its own weight and thereafter starts to rotate in a direction as indicated by the arrow to deliver the document D with a first surface of the uppermost portion thereof being the upper surface along a guide plate 24a.

Subsequently, the document D is drawn by a handling belt 22a and a handling roller 22b and only the uppermost sheet moves forward along a guide plate 24b. When the end thereof reaches a supply roller 23a which rotates in a direction as indicated by the arrow, a clutch C is actuated by a detection signal of an unshown sensor to disconnect the transmission of power to the delivery roller 21 and the handling belt 22a, rendering the rotation thereof free.

The document D prepared to be fed by the supply roller 23a is fed within a U-shaped guide portion 25a to assume a state wherein the document is reversed in inside and outside, and a shielding member 27 provided at an outlet of the guide portion 25a is moved by the end of the document D, which reaches the feeding belt 30 extended between a belt driving roller 28a which rotates clockwise and a driven roller 28b, and the document is continuously fed by the friction force thereof.

When the document D slidably fed leftward on the platen glass 11 by the feeding belt 30 stops because the left end thereof comes into contact with a document stopper member 12 provided on the left edge of the platen glass 11, the feeding belt 30 slips on the document D and runs idle but immediately thereafter the rotation of the belt driving roller 28a is once stopped by a signal issued from a control portion by the aforementioned sensor in a time-delayed for a certain time. That is, the feeding roller 28a is stopped a predetermined time after a time required for the document D from detection thereof by the sensor to arrival thereof to the document stopper member.

It is noted that the document stopper member is not always installed on the side of the recording apparatus but it can be installed on the side of ADF.

It is further noted that locating of the document can be made by controlling the feeding belt 30 so that the latter may stop at a predetermined position, instead of using the document stopper member 12.

Under this state, the document D is pressed upon the platen glass 11 by the feeding belt 30 which has been submitted to the own weights of a plurality of driven pressing rollers 29 to commence exposure of the first surface, after which a known process is effected to form an image and transfer it onto a recording sheet, thus terminating the reproduction of one side of the document.

Furthermore, in the ADF 20, to the right of the platen glass 11 is provided a document reversing portion 25b for reversing the inside and outside of the document D by a reversing route formed from a pair of thin metal sheet or resin sheet, the reversing portion 25b having one end open to and being connected to the guide portion 25a whereas the other end being opened to the right edge of the platen glass 11.

A group of feeding rollers 23b, 23c and 23d which rotate in a direction as indicated by the arrow are provided as necessary on the reversing portion 25b.

Figure 3:
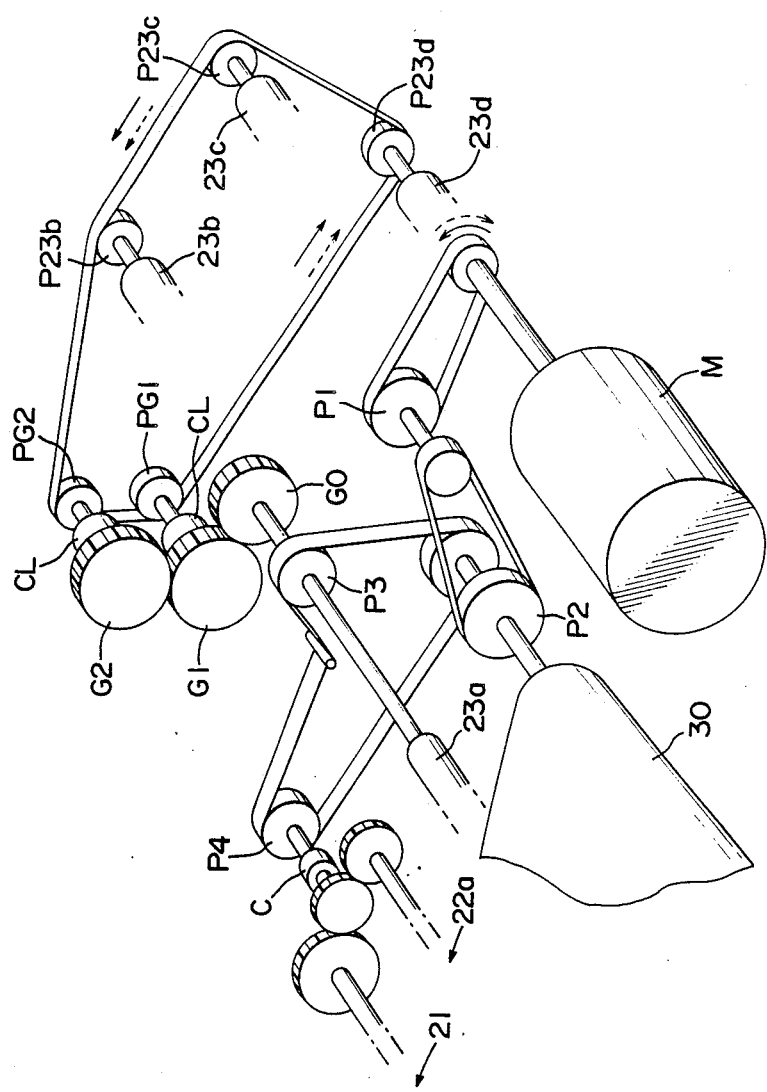
FIG. 3 is a perspective view showing a driving mechanism of said apparatus.

That is, in the automatic document feeding apparatus of the present invention, a section of the aforesaid document reversing portion 25b is formed from a feeding passage of a slit system, and therefore, the aforesaid feeding rollers 23b, 23c and 23d may be constructed by the paired driving rollers having a relatively small outer diameter. These feeding rollers 23b, 23c and 23d are arranged, for example, as shown in FIG. 1, corresponding to the shape of the feeding passage to thereby positively feed documents in the reversing portion 25b. The rotation of these feeding rollers is effected by a driving mechanism as shown in FIGS. 2 and 3. More specifically, this driving mechanism comprises a rotary shaft S1 of the paper supply roller 23a connected to the driving motor M for normal and reverse rotation, a gear G0 secured to said rotary shaft S1, a gear G1 meshed with the gear G0, and a gear G2 having the same size as and meshed with the gear G1, the gears G1, G2 having a unidirectional clutch CL connected thereto, said clutch CL being locked with the shaft only when the gears G1, G2 are rotated counterclockwise, a unidirectional turning force being transmitted to pulleys PG1, PG2 through the clutch CL. the feeding rollers 23b, 23c and 23d being driven through a belt in engagement with the pulleys PG1, PG2, P23b, P23c and P23d.

Accordingly, where the belt driving roller 28a is rotated counterclockwise to feed the document D to the reversing portion 25b by the feeding belt 30, the unidirectional clutch CL connected to the gear G2 operates but the unidirectional clutch CL connected to the gear G1 does not function because the gear G1 rotates clockwise, as a consequence of which the pulley PG1 assumes a play state, and the feeding rollers 23b, 23c and 23d are rotated counterclockwise by the belt drive of the pulley PG2.

Next, when the belt driving roller 28a is rotated clockwise by the reversal of the driving motor M as previously mentioned, the unidirectional clutch CL connected to the gear G2 assumes a play state and the unidirectional clutch CL connected to the gear G1 functions this time to drive the pulley PG1 counter-clockwise, and therefore, the feeding rollers 23b, 23c and 23d are rotated counter-clockwise also in this case. Arranged near the opening facing to the platen glass 11 is a photo-sensor 26 comprising a light emitting portion 26a and a light receiving portion 26b for detecting the document D which pass through the reversing portion 25b.

On the other hand, the document D having been exposed of the first surface by the aforementioned process is fed rightward on the platen glass 11 by the feeding belt 30 since the feeding roller 28a starts its rotation counterclockwise in synchronism with the termination of exposure.

Since the right end of the document D fed is blocked by the shielding member 27, the document does not enter the guide portion 25a, and thus the document D is to be fed smoothly into the reversing portion 25b according to the present invention.

Next, the document D is moved about counterclockwise within the reversing portion 25b in order of the feeding rollers 23d, 23c and 23b, and thereafter, the right end of the document D, or the end thereof in this case reaches the guide portion 25a to again move the shielding member 27 and is delivered onto the platen glass 11. However, since the length of the route of the reversing portion 25b is preset to be greater than the maximum length of various documents D, the left end or the rear end of the document D has passed in advance through a beam of the photosensor 26 to switch the rotation of the feeding roller 28a again to the clockwise direction in accordance with the signal thereof.

Accordingly, the document D delivered onto the platen glass 11 passes through the reversing portion 25b to thereby reverse the inside and outside of the document, and the inside or the second surface of the document is brought into facing to the platen glass 11 and the document is fed by the feeding belt 30 to the document stopping position in a manner as previously mentioned, that is, till the document comes into contact with the document stopper member 12.

Then, the rotation of the feeding roller 28a is again stopped by the signal delayed through a predetermined time from the photosensor 26. More specifically, the feeding roller 28a is stopped in the time required from detection of the document D by the photosensor to arrival of the document to the document stopping position or delayed through a predetermined time as mentioned above.

On the other hand, the apparatus body 10 is in the mode wherein the recording sheet having been reproduced in one side is terminated in fixing to reverse the inside and outside of the document so that the inside may be transferred and after the stoppage of the belt driving roller 28a, the inside or the second surface of the document D is subjected to exposure, image formation and transfer within the apparatus body 10.

When the inside of the document D has been exposed, the document stopper member 12 is withdrawn by the action of the solenoid or the like and subsequently, the belt driving roller 28a again starts its clockwise rotation to feed the document D leftward by the feeding belt 30 and into a document ejecting tray 50 provided with a document ejecting portion. In this manner, as repetition of copies progresses, documents D are successively stacked.

Immediately before the document ejecting tray 50 is provided an ejecting roller 31 which is rotated by a driving motor through the driven roller 28b, said ejecting roller 31 also being always rotated clockwise by the aforementioned driving mechanism irrespective of the reversal of the document D in the feeding direction, in a manner similar to that of the feeding rollers 23b, 23c and 23d to eject the document D towards the document ejecting tray 50.

That is, the aforementioned unidirectional clutch CL is mounted on a rotary shaft S11 of the driven roller 28b and another unidirectional clutch CL mounted on an intermediate shaft S12, whereby only when these shafts are rotated clockwise, the clutch CL functions so that the pulley P11 or pulley P12 causes the ejecting roller 31 to drive and rotate clockwise through the belt B11.

Accordingly, even if the driven roller 28b driven by the belt driving roller 28a through the feeding belt 30 is rotated in either clockwise or counterclockwise direction, the ejecting roller 31 is always rotated clockwise by the function of the driving mechanism as previously mentioned to continue the function of feeding the document with both sides already exposed to the document ejecting tray 50. Thereby, it is possible to prevent the ejected document from the ejecting tray from being rolled.

This motion is shown by arrows in FIG. 3 The belt is rotated in the same direction, when the motor is moved in either direction shown by the arrow of solid line or arrow of dotted line.

The apparatus is so designed as to provide a control that after the rear end of the document D has passed through the document stopper member 12, the stopper member 12 is returned to the illustrated position, the clockwise rotation of the feeding roller 28a stops to return the operating cycle of the ADF 20 to its initial state, and the feeding of a succeeding document D may be automatically started.

Alternatively, a succeeding document can be fed while ejecting the document D, and after the rear end of the document D has passed through the stopper 12, the latter is returned to its original position to stop the next document at a set position. It is noted that reversal can be made before the ejection of the document, which is then ejected.

The action of the feeding function of the document D in the first embodiment as described above is as shown in FIG. 5 in the form of a time chart. The switching o the feeding direction of and stopping of the document D are all controlled by the sole sensor 20 provided on a document reversing portion 25b to thereby make it possible to automatically and continuously reproduce both sides of the document.

Figure 4:
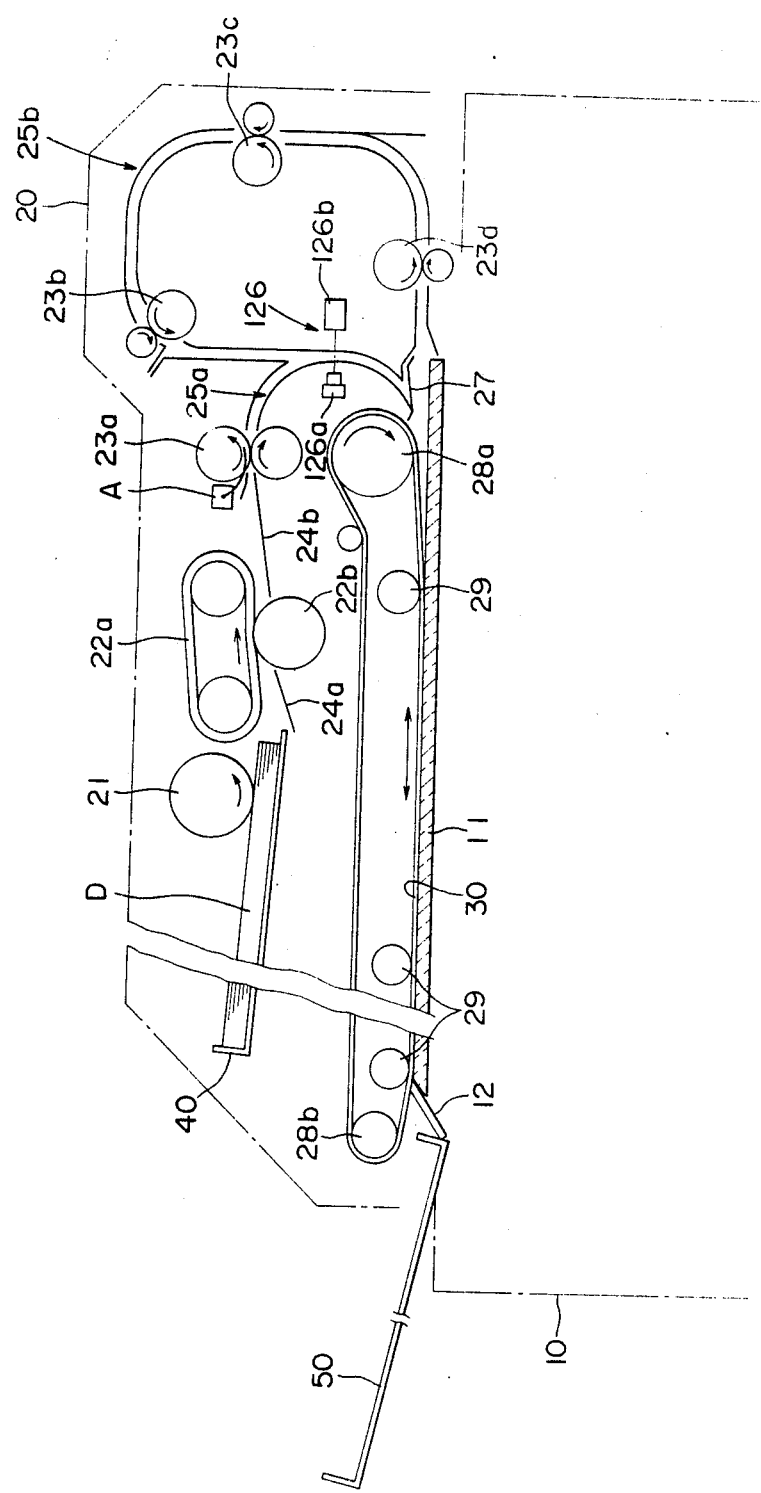
FIG. 4 is a sectional view of an automatic document feeding apparatus showing a further embodiment.

In the embodIment shown In FIG. 4, a photosensor 126 is arranged, in place of the sensor 26 in the first embodiment, within a feeding route where the guide portion 25a and the reversing portion 25b are joined, in which case, the photosensor 126 performs two detections, one wherein the document D is fed for exposure of the first surface via the guide portion 25a and the other wherein the document D has been already subjected to the exposure of the first surface and again passes through the guide portion 25a for exposure of the second surface via the reversing portion 25b. As the result, the sensor 126 becomes possible to control the stoppage of the feeding belt 30 at the time of exposure of the first surface and the supply roller 21 by a single photosensor as will be apparent from a time chart in FIG. 6.

Accordingly, in the second embodiment, it becomes possible to control a signal in the document feeding apparatus without providing the sensor A in the first embodiment.

It is to be noted that in any of the aforementioned embodiments, the document D may be again reversed in inside and outside by the reversing portion and the document D may be ejected as it is through the exposure portion to arrange it in the same page as the time when sheet is supplied. It is also possible that feeding of a succeeding document is started while ejecting the document D, and after the rear end of the document D has passed through the stopper, the latter is returned to stop the succeeding document at a set position.

The sensor used is not limited to a photo-sensor but a microswitch and other sensors may be used. This can be provided within the guide portion 25a common to the reversing portion.

Next, the arrangement of the driving motor M as a driving source will be described. A document feeding mechanism in ADF 20 is designed so that the feeding members shown in FIG. 1 are arranged between base plates A and B provided within the apparatus 20 shown in FIG. 2, and the driving members (indicated by single-dash-and-dot lines in FIG. 1) for rotating these feeding members are arranged at the rear of the base plate A, said members being driven and rotated by the power of the driving motor M.

Generally, the driving motor used is large in size and provided with a reduction gear device since loads are great, and in this connection, a large space is necessary to accommodate the motor in the apparatus. However, in the document feeding apparatus according to the present embodiment, the aforesaid group of reversing rollers are constituted by driving rollers having a small outer diameter to thereby form a large space internally of the document reversing portion 25b, said space being effectively utilized as one means to accommodate the driving motor M.

Thus, the shaft of the driving motor M is designed so as to extend through the base plate A to transmit the power to the respective driving member incorporated at the rear of the base plate A.

Namely, rotation of the driving motor M is reduced and transmitted from the pulley P1 to the pulley P2 through the timing belt to drive the feeding roller 28a and at the same time is transmitted from the pulley 2 to the pulley 3 and pulley 4 through the timing belt.

The aforesaid pulley 3 is provided to drive the coaxial and integral paper supply roller 23a and to drive the reversing rollers 23b, 23c and 23d through the gear G1 or G2 However, the gears G1 and G2 are engaged only in a direction of rotation opposed to each other between the coaxially mounted pulleys PG1, PG2, and a unidirectional clutch which render either of the gear G1 and pulley PG1 or the gear G2 and pulley PG2 coaxial and integral, so that any of the feeding rollers 23b, 23c and 23d may be rotated only counterclockwise irrespective of the rotational direction of the paper supply roller 23a.

Also, the rotation is transmitted from the pulley P4 to the delivery roller 21 and handling belt 22a through the clutch, and the pulley P4 is driven along with the feeding roller 28a.

These driving members except the driving motor M are all small members, and thus a small dimension of the depth occupied by the back of the base plate A will suffice, as a consequence of which the apparatus 20 is small in size and excellent in handling properties.

It is noted that members other than the driving motor M can be accommodated in a space formed internally f the reversing portion 25b to provide an extremely high value of utilization for realizing the compactness of the apparatus 20.

In the document feeding apparatus described above, t he inferior feeding sometimes occurs during the feeding of the document. To cope with this, measures are taken in the document reversing portion 25b to remove the document if a jam should occur.

FIGS. 7(a) and 7(b) show essential parts thereof.

The document reversing portion 25b comprises a section formed by an inner guide member 225a and outer guide members 225b, 225c which are molded from a thin metal sheet or a resin sheet, said section being in the form of a slit-like threadable feeding passage, one end of which is connected to the guide portion 25a whereas the other end connected to the right edge of the platen glass 11.

The inner guide member 225a and the outer guide member 225c are fixedly mounted on the ADF 20, but the outer guide member 225b is rotatably mounted through a rotational supporting portion 226 provided on the ADF 20. That is, when the ADF 20 is in operation, the FIG. 7 (a) state is taken and the outer guide member 225b is locked with respect to the ADF 20 and the section suitably spaced from the inner guide member 225a forms a slit-like threadable feeding passage, whereas when the guide member 225b is unlocked when the ADF 20 stops its operation and is rotated clockwise about the rotational supporting member 226, the upper portion of the document reversing portion 25b is opened as shown in FIG. 7 (b) to open the upper surface of the inner guide member 225a.

In the document reversing portion 25b are arranged feeding rollers 23b, 23c and 23d which are rotated counterclockwise by the motor in the ADF 20 but are prevented from reversal, and pressing rollers 223b, 223c, and 223d being pressed thereagainst and driven are provided, and among them, the pressing rollers 223b, 223c being mounted on and held by the outer guide member 225b.

Thereby, in the event that in the document reversing portion 25b, the inferior feeding resulting from the paper stop-up of the document D or the like should occur, when the outer guide member 225b is opened upon stoppage of the motor of the ADF 20, the feeding direction of the document is largely opened as shown in FIG. 7 (b) and at the same time, the sandwiching surface of the feeding rollers 23b, 23c and the like is also opened whereby the document D in the stop-up state may be pulled out easily and quickly to immediately reopen the feeding of the succeeding documents D.

The document feeding apparatus according to the present invention has realized to maintain the rotation of the feeding roller in the reversing portion and the ejecting roller even during the operation for reversing the inside and outside of the document by the provision of the driving mechanism which is simple and involves less trouble, whereby the continuous supply of documents becomes possible and the copying speed of the recording apparatus may be increased.

At the same time, the jam or the reversed feeding of the ejected documents caused by the reversal of the rollers during the feeding may be prevented, thus providing a document feeding 15 apparatus which can feed documents In a stabilized manner without damaging the documents.

While in the above-described embodiments, the system wherein the document is stopped at the time of exposure thereof has been described, it should be noted that a system wherein a document is exposed while moving it at a given speed as practiced in the Product Name "U-Bix 5000" (manufactured by KONI-SHIROKU PHOTO INDUSTRY CO., LTD.) may be easily applied to the present invention.

Furthermore, according to the document feeding apparatus of the present invention, a compact inside and outside reversing portion having a reversing route is further connected to a guide portion for reversing and feeding a document onto a platen glass whereby the inside and outside of the document may be continuously reproduced. The apparatus is provided at a position opposite the document ejecting tray is provided with the platen glass sandwiched therebetween as well as a simple construction of the apparatus whereby the document may be merely always fed only in one direction through the guide portion and the reversing portion to achieve the object of the invention, and in addition, the document stopper member is also withdrawn only when the document is moved out to achieve the object of the invention.

Accordingly, complicated switching members for the feeding passages and many reversing rollers need not be controlled as experienced in conventional feeding apparatus, thus realizing the proposal of a document feeding apparatus which is compact and free from trouble.

Moreover, according to the present invention, the document reversing portion is made to have its section formed into a loop-like configuration, wherein a plurality of small diameter feeding rollers are provided on the slit-like feeding guide, whereby a space may be formed internally of the document reversing portion, in which space the driving motor or other driving members may be accommodated, thus providing an automatic document feeding apparatus which is small in size and easy in handling.

In addition, according to the present invention, a driving motor as a power source for feeding documents is accommodated internally of a document reversing portion circulatingly formed whereby the apparatus is compact as compared with a conventional system wherein a driving motor is installed externally of the feeding route, and in addition, a large-sized or a powerful driving motor may be mounted, thus providing a document feeding apparatus which can positively reverse the document.

According to another embodiment, the aforementioned shielding member 27 is formed from a member which is thin such as a Mylar film, has an adequate resiliency and has a sliding surface. As shown in FIG. 10, the shielding member has its right end bonded to a branch portion 27a formed by an outlet of the guide portion 25a and an inlet of the document reversing portion 25b whereas the left end thereof placed in contact with the wall of the guide portion by the resiliency thereof.

Thus, the shielding member is always in a state of closing the outlet of the guide portion 25a as shown. However, when the document D is coming in a direction as indicated by arrow A as previously mentioned, the shielding member 27 is deformed by the end of the document D through the rigidity of the document D so that the document may pass therethrough, thus providing intermittent feeding. That is, the shielding member 27 used is of the nature wherein the member may be flexed or bended through a clearance enough to allow the document to pass through easily when the member is pressed by the end of the document D.

According to a further embodiment, the branch portion 27a can be provided at a position toward the upstream of The feeding passage in FIG. 2 without providing the shielding member 27 at the branch portion 27a which forms the outlet of the guide portion 25a. In this way, the recording sheet reversed and fed never enters the guide portion 25a unless the end of said recording sheet has a relatively strong upward curling nature. The present inventors have eliminated such a shielding member 27 as described above and employed a shape of a branch portion as described above to conduct many experiments, as the result that sufficiently satisfactory results were obtained.

In the above-described embodiment of the present invention, the conventional movable guide member which requires many parts and many numbers of assembling steps and further requires the provision of a power source and control device therefore has been eliminated, and the shielding member wherein simple members are merely bonded and fixed is used or the configuration of the feeding passage is modified without using the aforesaid shielding member whereby switching of the feeding passage for reversal of the document may be positively carried out.

As the result, the document feeding apparatus may be provided which has the great effect to reduce the price of the apparatus and is free from trouble even after a lapse of the severe using conditions for a long period of time.

What is claimed is:

1. A document feeding apparatus comprising a document supply tray on which documents are placed,
   a separating means for separating said documents one by one,
   a guide means for guiding the separated document,
   a first feeding means for feeding the guided document onto a platen from said guide means,
   a second feeding means having a feeding device rotatable in only one direction for removing the document from the platen, reversing an inside and outside of the document and feeding the document back to said first feeding means for return to the platen,
   a motor for driving said first and second means,
   a control means for rotating said motor in a normal direction when the document is fed from the document supply tray and in a reverse direction when a predetermined recording operation is completed, and
   a one-way clutch for connecting said motor with said second feeding means.

2. A document feeding apparatus comprising a document supply tray on which documents are placed,
   separating means for separating said documents one by one,
   first feeding means for feeding the separated documents onto a platen,
   second feeding means for removing the document from the platen, reversing an inside and outside of the document, and feeding the document to said first feeding means for feeding the reversed document back to the platen, and a power source for driving at least one of said first and second feeding means wherein said power source is arranged internally of said second feeding means.

3. The apparatus of claim 2 wherein said second feeding means comprises a document reversing portion composed of a loop-like feeding passage for reversing an inside and outside of a document and a plurality of small diameter feed rollers which are disposed on said feeding passage of said document reversing portion.

4. The apparatus of claim 3 wherein a resilient member is arranged adjacent to an outlet and inlet of said feeding passage.

5. The apparatus of claim 3 wherein said power source is located internally of said feeding passage.

6. The apparatus of claim 2 wherein said first feeding means is a reversibly rotating means.

7. The apparatus of claim 6 wherein said second feeding means has a feeding roller rotatable in only one direction.

8. The apparatus of claim 7 wherein both said first and second feeding means are driven by said driving source.

9. The apparatus of claim 8 wherein said second feeding means is connected to said driving source through a one-way clutch.

* * * * *